US005904067A

United States Patent [19]
Graffin

[11] Patent Number: 5,904,067
[45] Date of Patent: May 18, 1999

[54] ADJUSTABLE-TORQUE SCREWDRIVING SPINDLE ASSEMBLY

[75] Inventor: André Graffin, Andernos, France

[73] Assignee: Serac Group, La Ferte Bernard, France

[21] Appl. No.: 08/950,141

[22] Filed: Oct. 14, 1997

[30] Foreign Application Priority Data

Oct. 23, 1996 [FR] France .................................. 96 12907

[51] Int. Cl.[6] .............................. F16H 29/20; B25B 7/28

[52] U.S. Cl. ............................ 74/130; 53/317; 53/331.5; 91/59; 91/468

[58] Field of Search .................................. 74/130; 91/59, 91/468; 53/317, 331.5; 173/8

[56] References Cited

U.S. PATENT DOCUMENTS

| | | | |
|---|---|---|---|
| 1,920,240 | 8/1933 | Brady | 53/317 X |
| 3,866,463 | 2/1975 | Smith et al. | 73/99 |
| 4,637,423 | 1/1987 | Gray | 137/382.5 |
| 4,756,137 | 7/1988 | Lanigan | 53/202 |
| 5,027,932 | 7/1991 | Bertaud | 192/56 F |
| 5,423,159 | 6/1995 | Bankuty et al. | 53/317 |
| 5,473,855 | 12/1995 | Hidding et al. | 53/317 X |

*Primary Examiner*—Allan D. Herrman
*Attorney, Agent, or Firm*—Griffin, Butler, Whisenhunt & Szipl, LLP

[57] ABSTRACT

A screwdriving spindle assembly comprising a spindle shaft provided with a holding device and secured to a gear wheel rotated by a drive assembly which comprises a pressurized fluid actuating cylinder having a piston rod secured to a transmission system, and a member for adjusting pressure disposed on a line for feeding fluid to the cylinder in the screw-tightening direction.

7 Claims, 1 Drawing Sheet

ADJUSTABLE-TORQUE SCREWDRIVING SPINDLE ASSEMBLY

The invention relates to an adjustable-torque screwdriving spindle assembly, intended in particular for screwing screw caps onto packages that have threaded necks.

BACKGROUND OF THE INVENTION

Known screwdriving spindle assemblies include an electric or pneumatic motor for rotating a shaft whose end is fitted with a chuck device for holding caps. The shaft is also driven with vertical motion enabling the cap to be put into contact with and screwed onto a threaded neck.

One of the concerns relating to such spindle assemblies lies in controlling the tightening torque applied to the cap. It is important for the torque to be large enough to ensure that the package is properly closed and to avoid any untimely loosening of the cap while it is keeping the package closed, but without thereby obliging the user to make use of a tool for opening the package. A torque limiter device must therefore be interposed between the motor and the spindle shaft in order to transmit a determined tightening torque.

Friction-based torque limiter devices are known, in particular from documents U.S. Pat. No 4,756,137 and EP 387 153, which devices comprise two plates pressed one against the other. However the friction between the two plates gives rise to significant wear, and to heating, thereby altering their coefficients of friction. The transmitted tightening torque is therefore not constant. There also exist magnetic torque limiting devices that avoid the above-mentioned drawbacks. However, those devices suffer likewise from problems of adjusting torque, in particular because the magnetic elements age, and when permanent magnets are used, chattering occurs on sliding.

OBJECTS AND SUMMARY OF THE INVENTION

To obviate those drawbacks, the invention provides a screwdriving spindle assembly comprising a spindle shaft provided with a holding device and secured to a gear wheel rotated by a pressurized fluid actuating cylinder having a piston rod secured to a transmission system disposed to drive the gear wheel, and a member for adjusting pressure disposed on a line for feeding fluid to the cylinder in the screw-tightening direction.

In this way, since the tightening torque is directly a function of the force applied by the cylinder, which in turn is directly a function of the feed pressure applied to the cylinder by the fluid under pressure, the tightening torque is determined by the cylinder feed pressure such that the cylinder performs simultaneously the function of a drive member and the function of a torque limiter.

Spindle assemblies of the invention are therefore simpler and cheaper than present spindle assemblies.

Another advantage of the invention lies in the fact that it is possible to adjust the tightening torque of a plurality of spindle assemblies in a multi-spindle turret by acting on a device for adjusting the common feed pressure for all of the spindles. This avoids the need for fiddly manipulation of each spindle assembly which can give rise to an increasing risk of error with an increasing number of spindles in the turret. Such feed pressure adjustment can also be performed while the turret is in operation. The invention thus increases the reliability and the profitability of such turrets.

In an advantageous embodiment of the invention, the transmission system includes a rack.

Advantageously, the rack extends parallel to the longitudinal axis of the spindle shaft and the transmission system includes a gear for transmission at an angle. The spindle assembly of the invention is thus particularly compact.

In a preferred embodiment of the invention, the transmission system includes a free-wheel mounted to provide one-way drive to the holding device in the screw-tightening direction. In this way, the cylinder can be returned to the retracted position before releasing the cap-holding device, such that at the moment when the holding device is released, it is certain that the spindle is not subjected to any torque, thus avoiding scraping the cap during such disengagement.

Advantageously, the cylinder is constrained to move in translation with the spindle shaft.

This disposition makes the spindle assembly of the invention more compact.

According to another characteristic of the invention, the transmission system includes a toothed wheel of diameter greater than that of the gear. This makes it possible to increase the number of screw-tightening turns of the spindle for a given stroke of the cylinder.

In an advantageous version of the invention, at least one sensor is disposed to detect a position of the cylinder piston rod.

By adding one or more piston rod-position sensors it becomes possible to monitor progress of a screw-tightening operation. Excessive displacement of the piston rod can mean that there is no cap, whereas too little displacement, even though the tightening torque is reached, can mean that a cap has been wrongly engaged on the neck of the packaging. Means are thus obtained that are simple and cheap for ensuring quality of the screw-tightening operation.

BRIEF DESCRIPTION OF THE DRAWINGS

Other,characteristics and advantages of the invention appear further on reading the following description of a particular, non-limiting embodiment of the invention given with reference to the sole accompanying figure which is a fragmentary perspective view of a screwdriving spindle assembly of the invention.

MORE DETAILED DESCRIPTION

Figure 1:
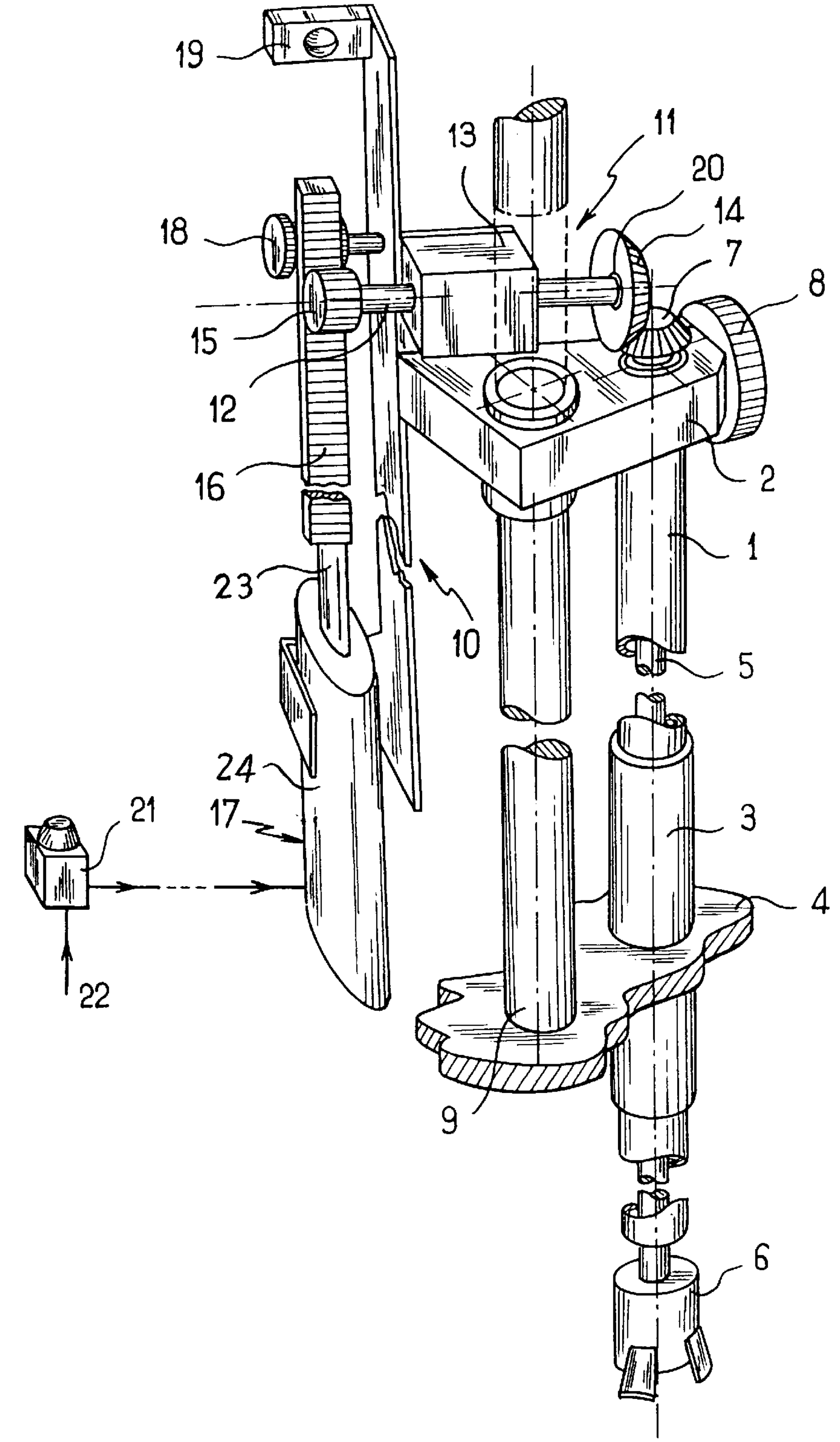

With reference to the figure, the screwdriving spindle assembly of the invention has a vertical guide tube 1 whose top end is fixed to a spindle support 2 and which slides vertically in a sleeve 3 secured to a rotary platform 4. The tube 1 rotatably receives a spindle shaft 5 whose bottom end projects beyond the tube 1 and carries a chuck-type holding device 6 actuated in conventional manner. The top end of the spindle shaft carries a conical gear wheel 7 co-operating with a drive assembly given overall reference 11.

The spindle support 2 is mounted to slide on a column 9 fixed to the rotary platform 4 and carrying a cam-follower 8 for co-operating with a cam (not shown) for positioning the height of the support 2 and the parts associated therewith.

A support plate 10 is fixed on one side of the spindle support 2 and carries the drive assembly 11.

The drive assembly 11 comprises an intermediate shaft 12 mounted to rotate in a bearing 13 carried by the support plate 10. The shaft 12 has one end carrying, via a free-wheel 20, a conical gear wheel 14 whose teeth mesh with those of the gear wheel 7 for conveying transmission at an angle, and at its opposite end it carries a drive pinion 15 whose teeth mesh with the teeth of a rack 16. The rack 16 extends vertically and is fixed at its bottom end to the piston rod 23 of a vertical axis actuating cylinder 17 whose cylinder body 24 is fixed to the support plate 10. The cylinder 17 is connected to a pressure adjustment member 21 located on a pressurized fluid feed line 22 for driving the piston rod 23 in a cap-tightening direction.

A backing wheel 18 whose axis of rotation is parallel to that of the drive pinion 15 is rotatably mounted at the top end of the support plate 10 and is disposed substantially facing the drive pinion 15 on the side of the rack 16 opposite to its side facing the pinion 15 so that the rack 16 is held pressed against the drive pinion 15.

A sensor 19 is fixed at the top end of the support plate 10 at a level corresponding to an extreme position of the rack 16 when the piston rod 23 of the cylinder 17 is fully extended.

In operation, the platform 4 is rotated relative to a stationary structure by a motor (not shown). Packages with threaded necks (not shown) are fed in and are held vertically beneath the holding device 6 by a device that is not shown.

The support 2 and all of the elements associated therewith constitute an assembly that is movable in vertical translation but that is constrained to rotate with the platform 4. The vertical positioning of this moving assembly is ensured by contact between the cam-follower 8 and the camming surface of the cam, and therefore depends on the cam profile.

While the package having a threaded neck is being brought to a position immediately below the holding device 6, said device is actuated in conventional manner to take hold of a cap from a distributor (not shown). The cam-follower 8 following the cam profile of the cam on the structure then causes the moving assembly to move down towards the threaded neck.

Once the cap is in contact with the threaded neck, pressurized fluid is fed to the cylinder 17 at a pressure that is preadjusted by the pressure adjustment member 21. The piston rod 23 pushes the rack 16 upwards. The rack 16 rotates the drive pinion 15. The pinion 15 transmits its drive to the holding device 6 via the shaft 12, the gear wheels 14 and 7, and the spindle shaft 5 pivoting inside the guide tube 1. In this context, it should be observed that the free-wheel 20 is mounted so that the piston rod 23 drives the spindle shaft 5 in the screw-tightening direction but does not drive it while the piston rod 23 is retracting. The diameter of the gear wheel 14 is preferably greater than that of the gear wheel 7 so as to enable screw-tightening to be performed over several turns for a short stroke of the piston rod 23, thus making it possible to use a cylinder 17 that is compact.

When the cap-tightening torque causes an opposing torque to be generated of a value equal to that of the driving torque resulting from the feed pressure applied to the cylinder 17, the shaft 5 ceases to rotate and the rack 16 stops. Thereafter, at an angular position of the platform that corresponds to the end of the screwing cycle, the piston rod is retracted, either by reversing its feed when the cylinder is double-acting, or else merely by switching off its feed and using resilient return means if the cylinder is single-acting. Because the gear wheel 14 is mounted on a free-wheel, the spindle shaft 5 remains stationary. The chuck of the holding device 6 can therefore be opened without any danger of scraping the cap. The spindle assembly is raised, ready for a new cycle.

The sensor 19 is disposed at the end of the stroke of the rack, beyond the distance which the rack 16 ought normally to cover in order to achieve the number of turns appropriate for screwing on the cap.

If the rack 16 is detected by the sensor 19, that means that the torque corresponding to the feed pressure has not been reached because of the absence of a cap, because the cap is faulty, or because the neck of the packaging is damaged.

The sensor 19 then instructs the improperly closed package to be conveyed to a reject circuit.

When it is desired to put caps on a new series of packages for which a tightening torque is required different from that used before, it suffices to alter the feed pressure setting for the cylinder 17.

The invention is not limited to the embodiment described, but also covers any variant using equivalent means to reproduce the essential characteristics of the invention as defined by the claims.

In particular, although the free-wheel 20 is shown as being between the intermediate shaft 12 and the gear wheel 14, it would be possible to locate the free-wheel at any point in the drive system between the cylinder 17 and the holding device 6. It is also possible to provide a drive system that does not include a free-wheel. Under such circumstances, it becomes necessary to connect the cylinder 17 to exhaust without retracting it prior to opening the chuck.

Although the rack 16 is shown in a vertical position, it could be positioned horizontally and engage the gear wheel 7 directly, in which case the gear wheel is preferably cylindrical.

Although a rack is used in the embodiment described, the invention could be implemented with any mechanism that transforms the translation motion of the cylinder piston rod 17 into rotary motion for driving the spindle shaft 5, e.g. a crank and connecting piston rod type mechanism.

I claim:

1. A screwdriving spindle assembly comprising a spindle shaft provided with a holding device and secured to a gear wheel rotated by a pressurized fluid actuating cylinder having a piston rod secured to a transmission system disposed to drive the gear wheel, and a member for adjusting pressure disposed on a line for feeding fluid to the cylinder in the screw-tightening direction.

2. A spindle assembly according to claim 1, further including a free-wheel mounted to drive the holding device in a screw-tightening direction only.

3. A spindle assembly according to claim 1, in which the transmission system includes a rack.

4. A spindle assembly according to claim 3, in which the rack extends parallel to the longitudinal axis of the spindle shaft, and the transmission system includes a gear wheel for transmitting drive through an angle.

5. A spindle assembly according to claim 1, in which the shaft of the spindle is movable in translation, and the cylinder is constrained to move in translation with the spindle shaft.

6. A spindle assembly according to claim 1, in which the transmission system includes a toothed wheel having a diameter greater than that of the gear wheel.

7. A spindle assembly according to claim 1, in which at least one sensor is disposed to detect a position of the cylinder piston rod.

* * * * *